(No Model.)

W. E. BUNKER.
SELF LOCKING NUT.

No. 511,996. Patented Jan. 2, 1894.

WITNESSES:

INVENTOR
W. E. Bunker
BY
Munn & Co
ATTORNEYS.

UNITED STATES PATENT OFFICE.

WALTER E. BUNKER, OF NATICK, MASSACHUSETTS.

SELF-LOCKING NUT.

SPECIFICATION forming part of Letters Patent No. 511,996, dated January 2, 1894.

Application filed May 17, 1893. Serial No. 474,539. (No model.)

*To all whom it may concern:*

Be it known that I, WALTER E. BUNKER, of Natick, in the county of Middlesex and State of Massachusetts, have invented a new and useful Improved Self-Locking Nut, of which the following is a full, clear, and exact description.

This invention relates to improved means for the prevention of a nut from relaxing, when screwed upon a bolt and impinged upon a solid body penetrated by the bolt, and has for its object, to provide a screw nut, with an attached locking device, which may be integral with the nut, and that will by a frictional engagement and pressure upon material penetrated by the bolt having the nut, hold the nut secured from a reverse movement which would release it.

To this end, my invention consists in the peculiar construction of parts, as is hereinafter described and claimed.

Reference is to be had to the accompanying drawings, forming a part of this specification, in which similar letters of reference indicate corresponding parts in all the figures.

Figure 1:
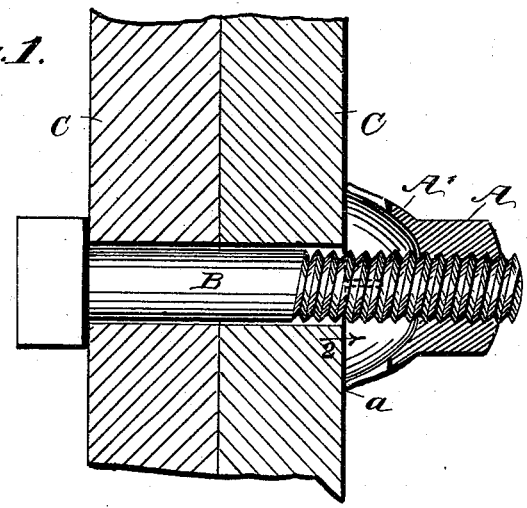
Figure 2:
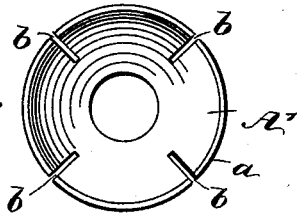
Figure 3:
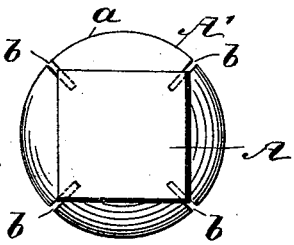

Figure 1 is a side view, in section, of the improvement applied to a bolt, and material clamped between the head of the bolt and the novel device. Fig. 2 is a detached end view of the improvement opposite the arrow 2 in Fig. 1; and Fig. 3 is a detached view, showing the opposite end of the improved device.

The body of the nut A, may be hexagonal, or square, the last named form being represented in the drawings, having the usual threaded aperture for an engagement with the threaded body of a bolt B.

The improvement consists in the formation of a curved cupped projection A' directly from the lower edge of the nut A to provide a base for the nut, the said cupped portion A' forming a dome shaped wall which is thicker at its crown or point where it spreads out directly from the base of the nut and gradually tapering to its lower edge, the wall A' is slotted upwardly a short distance, said slots being properly spaced apart. The entire lower edges of the spring arms formed by the slots in the dome like wall of the part A' are all in the same plane, and hence bear equally against the abutting surface at every point.

In use, the nut A, when screwed upon a bolt B, that is employed to clamp two portions of a structure together, as represented by the pieces C, in Fig. 1, produces a forcible impinge of the edge a, on the side of the portion C; this will bend the edge named slightly outward, and thus cause its sharp inner edge, to be embedded in the engaged material, the sharp corners produced by the slots b, coacting with the edge mentioned, to produce a considerable frictional resistance that will prevent an accidental reverse movement of the nut, which may be easily removed by a wrench.

Having thus described my invention, I claim as new and desire to secure by Letters Patent—

A self locking nut consisting of the nut proper and the integral cup like base united at its crown directly to the nut proper and extended in the nature of a longitudinal prolongation of the nut proper, having its outer bearing edge formed throughout in the same plane whereby it will bear uniformly against the abutment up to which it is turned and provided in its said bearing edge with slits which extend up the sides of but terminate short of the crown of the cup whereby the crown of the cup will operate as a brace and support for each of the spring sections formed by slitting the edge of the cup, all substantially as set forth.

WALTER E. BUNKER.

Witnesses:
GEORGE NUTT,
LESLIE W. HARRIS.